United States Patent
Nagel et al.

(10) Patent No.: US 9,683,140 B2
(45) Date of Patent: Jun. 20, 2017

(54) ADHESIVE TAPE AND ITS USE

(75) Inventors: Christoph Nagel, Hamburg (DE); Kerstin Götz, Hamburg (DE)

(73) Assignee: tesa SE, Norderstedt (DE)

( * ) Notice: Subject to any disclaimer, the term of this patent is extended or adjusted under 35 U.S.C. 154(b) by 738 days.

(21) Appl. No.: 12/473,807

(22) Filed: May 28, 2009

(65) Prior Publication Data

US 2009/0297833 A1    Dec. 3, 2009

(30) Foreign Application Priority Data

| Jun. 3, 2008 | (DE) | .................. | 10 2008 026 443 |
| Jun. 3, 2008 | (DE) | .................. | 10 2008 026 447 |
| Jun. 3, 2008 | (DE) | .................. | 10 2008 026 448 |
| Nov. 27, 2008 | (DE) | .................. | 10 2008 059 381 |

(51) Int. Cl.
- *C09J 105/00* (2006.01)
- *C09J 7/02* (2006.01)
- *B65H 19/10* (2006.01)

(52) U.S. Cl.
CPC .......... *C09J 105/00* (2013.01); *B65H 19/102* (2013.01); *C09J 7/0296* (2013.01); *B65H 2301/41766* (2013.01); *C09J 2201/122* (2013.01); *C09J 2203/342* (2013.01); *C09J 2405/006* (2013.01); *Y10T 428/26* (2015.01); *Y10T 428/31504* (2015.04)

(58) Field of Classification Search
None
See application file for complete search history.

(56) References Cited

U.S. PATENT DOCUMENTS

| 5,323,981 A | | 6/1994 | Dionne | |
| 5,425,991 A | * | 6/1995 | Lu | .................. 428/352 |
| 6,432,241 B1 | | 8/2002 | Congard et al. | |

(Continued)

FOREIGN PATENT DOCUMENTS

| CA | 2511994 C | 9/2012 |
| CN | 1740254 A | 3/2006 |

(Continued)

OTHER PUBLICATIONS

European Search Report for correspondence European Application No. 09160661.6 dated Aug. 9, 2013.

(Continued)

*Primary Examiner* — Frank D Ducheneaux
(74) *Attorney, Agent, or Firm* — Norris McLaughlin & Marcus, P.A.

(57) ABSTRACT

An adhesive bonding system joins flat webs when changing rolls of such webs. The adhesive bonding system comprises two adhesive tape boundary edges, and further comprises a top carrier layer and a bottom carrier layer, a flat connecting element that connects the two carrier layers to one another and is suitable for opening the connection under the conditions of a static or flying roll change. At least one of the boundary edges of the connecting element does not extend in a straight line, and a straight-line emphasis line is defined in relation to this boundary edge, the emphasis line of this boundary edge extends along a preferential direction, and this boundary edge has a multiplicity of regions lying on one side of its emphasis line and also a multiplicity of regions lying on the other side of its emphasis line.

10 Claims, 3 Drawing Sheets

(56) References Cited

U.S. PATENT DOCUMENTS

| | | | |
|---|---|---|---|
| 6,595,461 B1 * | 7/2003 | Storbeck et al. | 242/556.1 |
| 6,627,023 B1 | 9/2003 | Gleichenhagen et al. | |
| 7,087,278 B2 * | 8/2006 | Eikmeier et al. | 428/40.1 |
| 2008/0286533 A1 | 11/2008 | Gotz et al. | |
| 2009/0280323 A1 | 11/2009 | Harder et al. | |

FOREIGN PATENT DOCUMENTS

| | | |
|---|---|---|
| DE | 19628317 A1 | 1/1998 |
| DE | 19841609 A1 | 3/2000 |
| DE | 19902179 A1 | 8/2000 |
| DE | 10058956 A1 | 6/2002 |
| DE | 102005051181 A1 | 4/2007 |
| EP | 1076026 A2 | 2/2001 |
| EP | 2116581 A1 | 11/2009 |
| WO | 9529115 A1 | 11/1995 |
| WO | WO 9946196 A1 * | 9/1999 |
| WO | WO 2007048695 A1 * | 5/2007 |

OTHER PUBLICATIONS

Chinese Office Action for corresponding Chinese Application No. 201310743860.X dated Nov. 27, 2014.

* cited by examiner

ADHESIVE TAPE AND ITS USE

The invention relates to an adhesive tape for flying roll change of flat-web material wound up to form rolls and a method of flying roll change of flat-web material wound up to form rolls.

In the processing of flat-web material (paper, films, non-wovens or the like) a roll change on the fly (flying splice) is a common method of replacing an old, almost fully unwound roll by a new roll without having to stop the quick-running machines in order to do so. In the course of on-the-fly roll changes of this kind it is common to employ (pressure-sensitive) adhesive tapes in order to join (or splice) the end of the old web to the start of the new web.

For years in this context there have been adhesive tapes known which are adhered in a straight line beneath or atop the uppermost ply of the new roll and so combine in one tape the function of the roll closure and also of the adhesive splicing tape (the adhesive tape that joins the new flat web (more particularly a paper web) to the old, expiring flat web).

During the splicing operation it is necessary for the roll closure to open in order to allow the new flat web to be attached to the end portion of the expiring flat web, so that, after the splicing operation, the new flat web runs off from the new roll in a continuous operating regime.

U.S. Pat. No. 5,323,981 A discloses a two-sided adhesive tape having on its outside a high-tack adhesive for flying splice. On its reverse there are two adhesives positioned and advantageously an adhesive-free zone between the adhesives. In this arrangement, the rear adhesive, which is permanently adhesive, is bonded to the uppermost ply of the new roll, and the front adhesive, which is repositionable, is bonded via the uppermost ply to the second ply. In this version, the repositionable adhesive plays the part of the roll closure. In the case of flying splice, the expiring web comes into contact with the new roll on the top face of the adhesive tape. The repositionable adhesive detaches from the material of the second ply, and the new roll is drawn into the machine, held by the permanent adhesive at the end of the adhesive tape.

WO 95/29115 A discloses a similar adhesive tape. This two-sided adhesive tape has two adhesives on the top face and one adhesive on the bottom face. This adhesive tape is fastened beneath the uppermost ply of the new roll. In this arrangement, one adhesive holds the uppermost ply. The second adhesive is responsible for contact with the expiring web. On the reverse face there is also a repositionable adhesive, which in the case of the splice exposes the uppermost ply. Both adhesive tapes have a common disadvantage. With both of them, the repositionable adhesive runs openly through the finishing machine, with the consequence that there may be instances of webs sticking to deflection rollers or printing blankets. This may then lead to tears in the webs.

A remedy to this problem is taught by DE 196 28 317 A. The adhesive tape has a construction similar to that of WO 95/29115 A, but the repositionable adhesive on the reverse face is replaced by a two-sided adhesive tape featuring a splittable carrier. In the case of the splice, the carrier splits and, with the respective remnants, covers the adhesives in such a way that they remain non-adhesive. This prevents disruptive instances of sticking in the course of passage through the finishing machines.

A further remedy is taught by DE 199 02 179 A. In that case the splitting strip is recessed from the front edge. This recession permits a significant increase in splicing efficiency.

DE 198 41 609 A describes a double-sidedly adhesive attachment element. The carrier is composed not of a single-ply paper but instead of a paper/paper composite which is joined with curing adhesive dots. This adhesive tape is also adhered beneath the uppermost ply. In the case of the splice, the adhesive dots extract fibres from one of the composite papers, thereby exposing the uppermost ply.

All of these products have a disadvantage. The splittable system, whether it be a paper, a composite of two papers, a paper/film composite, a composite of two films, or a polymer layer which splits, exhibits a force peak at the moment of incipient splitting, as a result of the fact that the splittable system splits simultaneously over its entire width. Particularly when the adhesive splicing tape is used on coated papers, and especially on coated gravure papers, the force spikes lead continually to the failure of the adhesive tape. One of the reasons for this failure is that the splitting forces can be higher than the forces which anchor the paper coating, in which case the coating separates from the paper. Or else the splitting forces are in fact higher than the internal strength of the paper, in which case there are paper tears. In both cases the splice is unsuccessful.

An improvement is taught by DE 100 58 956 A. In order to avoid a force spike, the splitting strip has a jagged design. The tips of the jags point in the running direction of the operation, and so, at the moment of splicing, the tip of the jag begins to split. Because of the small area in the tip, the force values are reduced as well. This system, however, has the disadvantage that, at the tip of the jag, the bond area approaches zero. Accordingly the bond strength at the tip is not enough to ensure splitting at the tip. Depending on the quality of the paper to be split, there is splitting beneath the tip, specifically at the point where the bond strengths are higher than the splitting forces. In other words, some unsplit components of the splitting strip pass through the printing or paper further-processing machine, and may lead to instances of contamination. Since the bond strengths of the splittable system are dependent on the paper type, the size of these unsplit components varies and so, too, does the force required for splitting.

An improvement is taught by DE 10 2005 051 181 A. Here, the splitting strip is not given a jagged design, but instead is rounded at the tips. This leads to an increase in the bond area, which always generates a sufficient bond strength and thereby ensures reliable splitting. However, the non-linear geometries of the splittable system exhibit a weakness. When the adhesive tape featuring the splittable system is unwound from a roll of adhesive tape, there are stresses at the leading edges of the splitting system, which stand transversely to the direction of unwinding, and, in certain cases, the splitting strip begins to split. Premature splitting occurs in particular in the case of wave forms or geometries which are distinguished by a high slope of the geometry. Since the splitting system constitutes a coherent two-dimensional structure, the unwanted splitting may run over a relatively long section of the splittable system, and in certain cases there may even be complete splitting of the wave-form splitting strip. This is particularly critical in those cases in which it is not noticed by the user, since the splice performance falls. If the user notices the incipient splitting or complete premature splitting of the splitting strip, the adhesive tape must be newly applied, which is time-consuming and has an adverse effect on productivity.

Moreover, this system is confined to those applications in which the splittable system can be paper. For applications particularly in the film-producing and -processing industry, paper is an unwanted material of use. Here the system specified above cannot be used.

Furthermore, the splitting paper with its coating of adhesive exhibits a restriction in the diversity of the adhesives that can be used. In no case must the adhesives migrate into the splitting paper because of inadequate viscosities, since that can alter the splitting forces in an unwanted way and then lead to faults in the application.

BRIEF DESCRIPTION OF THE DRAWINGS

The invention will now be described in greater detail with reference to the drawings, wherein.

Figure 1:
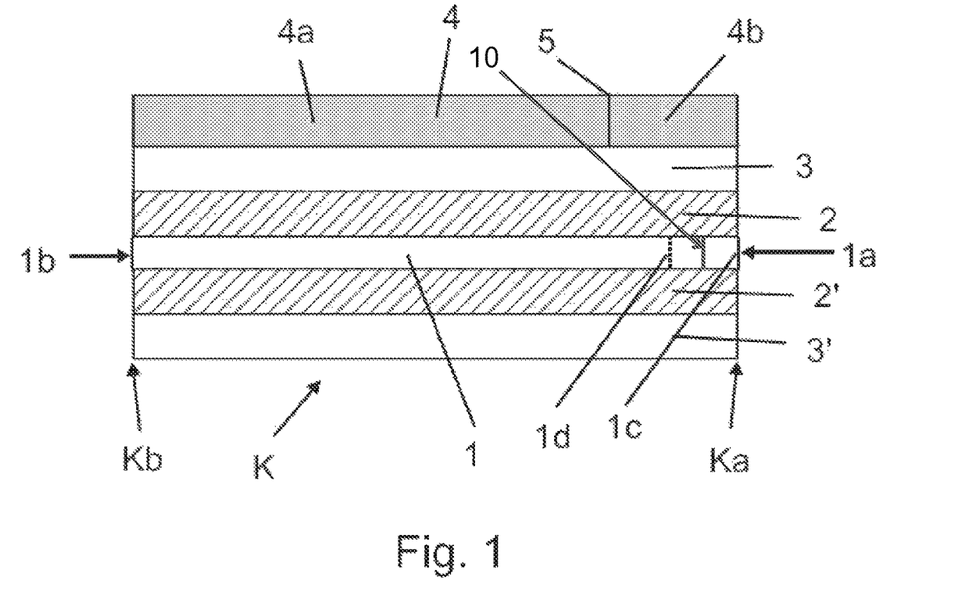
FIG. 1 is a cross-sectional view of an adhesive bonding system in an embodiment of the present invention.

The object is achieved by means of an adhesive bonding system for joining flat webs when changing rolls of such webs, comprising two adhesive tape boundary edges, which advantageously run substantially parallel and in particular form the long edges of an adhesive tape, further comprising at least one top carrier layer and one bottom carrier layer, and also a flat connecting element that connects the two carrier layers to one another and is suitable for opening the connection under the conditions of a static or flying roll change, and further comprising two layers of adhesive which are each provided on the surface of each carrier layer that faces away from the connecting element, the connecting element not being a layer of adhesive, and the connection between the connecting element and at least one of the carrier layers not being brought about by means of further layers of adhesive. For the adhesive bonding system of the invention it is the case that at least one of the boundary edges of the connecting element does not run in a straight line (in other words, is non-linear), and a straight-line emphasis line 10 or a main direction line 10 is defined in relation to this boundary edge as shown in FIG. 1, the emphasis line 10 of this boundary edge extending along a preferential direction, and this boundary edge has a multiplicity of regions lying on one side of its emphasis line 10 and also a multiplicity of regions lying on the other side of its emphasis line 10.

Preferably, the connecting element does not comprise layers of adhesive; very preferably, the adhesive tape has no layers of adhesive between the carrier layers. Non-adhesive in the sense of this specification means that the layer in question is unable, in application, to expose any adhesive or tacky surfaces when it is destroyed or parted from its substrate. Accordingly, although the layers may be applied, for example, as adhesive substances and may in that state bring about the joining connection, there is nevertheless drying in these cases subsequently, and so the layer that remains would no longer be adhesive or tacky even if it were to be exposed. In other words, the layer that is present in the adhesive tape that remains for application is a layer which has non-adhesive properties irrespective of it being lined by a carrier material or by other substrates. Conversely, pressure-sensitive adhesives remain tacky per se even when they have bonded two substances to one another; their functionality (their adhesive bonding effect) to the outside is hindered only by lining. For the purposes of this specification, therefore, layers of composition are not adhesives especially when in the application state, i.e., in particular, in the dried state, they possess no self-adhesive properties, in other words have no tack.

When the view is directed onto the individual layers (e.g. carrier layers, layers of adhesive or the layer that forms the connecting element), the course of the respective boundary edges of the layers can be interpreted mathematically as curves. The line 10 referred to as the emphasis line 10 (also referred to as the main direction line 10) of an edge is, for the purposes of this specification, the line 10 which divides the curve that describes the respective edge in such a way that the total area of the areas that lie on one side of the emphasis line 10, these areas being enclosed by the straight line representing the emphasis line 10 and by the curve itself, and the total area of the areas that lie on the other side of the emphasis line 10, these areas being enclosed by the straight line that forms the emphasis line 10 and by the curve, are identical.

In an outstanding approach the emphasis lines [main direction lines] of the at least two adhesive tape boundary edges (long edges of the adhesive tape) run parallel and extend into the preferential direction, in other words into the direction in which the emphasis line 10 of the non-linear edge of the connecting element also extends.

The connecting element may be arranged flush to one of the long edges of at least one carrier layer, especially in such a way that the points projecting furthest forward of the edge, not formed in a straight line, of the connecting element are situated on the corresponding carrier layer edge. For the use of the invention in flying roll change, however, it has emerged as being very advantageous if the connecting element is arranged with a spacing from a long edge of at least one carrier layer, advantageously of both carrier layers, the spacing being defined as the distance of the line through the points, situated furthest in the direction of the corresponding carrier layer edge, of the connecting element boundary edge to the edge or edges of the carrier layer or layers, or, in the case where the carrier layer edge or edges is or are non-linear, to their emphasis line or lines.

This new adhesive bonding system solves the three problems described above. The innovative adhesive tape construction prevents the splitting strip starting to split on unwind. The plane of force on unwinding from the roll is located between the adhesive of the open side and the parting medium; the connecting medium is lined by a carrier and is therefore not exposed to stress, and so there is no premature parting in the connecting plane.

Since the carrier materials need not necessarily be produced from a paper, it is possible to provide a paper-free product. Since both adhesives are coated on a carrier, which can be stable to migration, it is possible to coat adhesives of any viscosity onto both sides.

Very advantageous is an embodiment in which the emphasis line 10 of the at least one boundary edge, not extending in a straight line, of the connecting element to the emphasis line 10 of the boundary edge of at least one of the carrier layers exhibits a spacing. The spacings are dependent, in addition to application speed, on the splitting energy (across the width of the connecting element) and on the maximum force during the splitting process. The maximum force and the splitting energy are measured by a splitting in the application direction (T-block), in other words, in particular, perpendicular to the main direction line 10 (which in a preferred version corresponds to the longitudinal direction of the adhesive tape).

Both criteria here are important for the respective application.

The maximum value of the splitting force can be adjusted through the nature of the polymer (layer forming connecting element) or the coat weight of the polymer. The splitting energy then comes about additionally through the width of the connecting element to be split, and the design of the boundary edge. Splitting force values, and also the maximum value of the splitting force, are measured in the application direction, in other words perpendicular to the main direction line 10 of the non-linear side of the connecting element (in other words, in particular, perpendicular to the longitudinal direction of the adhesive tape). In this procedure, the top carrier is peeled at a 90° angle, in a tensile testing machine, from the bottom carrier, and the connecting element parts ("splits"). The peel speed is 300 mm/min. The initial value of the splitting force (i.e. the splitting force value when the connecting element starts to split) is recorded, as are the split propagation forces, which can be determined across the width of the connecting element during splitting. The splitting energy can be determined with the known width of the parting system (connecting element).

Splitting forces (split propagation force after splitting process has commenced) can likewise be measured in the direction of the main direction line 10 of the connecting element, in other words in particular in the longitudinal direction of the adhesive tape. The values specified in this direction are determined by a measurement in which the top carrier is peeled at a 180° angle, in a tensile testing machine, from the bottom carrier, with the connecting element parting ("splitting"); the peel rate here as well is 300 mm/min.

In the absence of further remarks when reporting splitting force values and splitting energy values in the context of this specification, the figures relate in each case to the measurement in application direction.

For thin, tear-sensitive materials, the maximum value of the splitting force ought advantageously not to exceed 1 N/cm, and the splitting energy ought to be less than 80 Nmm. In the case of thicker materials that are less sensitive to tearing, the values can be higher.

With regard to the spacing, it is the case that, the faster the splicing operation takes place in the application, the smaller the spacing from the leading edge ought to be, despite the fact that a greater spacing would facilitate splitting and hence would increase the splicing efficiency. Conversely to this is the effect that, at high speeds, there is an increase in the risk of the leading edge turning over.

The stated spacing between the emphasis line 10 of the boundary edge, which does not extend in a straight line, of the connecting element and the emphasis line 10 of the boundary edge of at least one of the carrier layers is with particular advantage up to 15 mm and ought preferably to be at least 0.3 mm.

For applications, in particular, in a speed range from approximately 33 m/s to approximately 15 m/s, a spacing of 0.3 mm (advantageously 0.5 mm) to 2.5 mm is ideal. Particularly for speeds of approximately 15 m/s to approximately 9 m/s, the spacing ought preferably to be 2.5 mm to 5 mm. The selected spacing can be larger because, owing to the lower speeds, there is not such a high risk of the leading edge turning over.

In particular for speeds of approximately 9 m/s to approximately 5 m/s, the spacing ought advantageously to be 5 mm to 10 mm, and, in particular, in the case of almost static applications, the spacing ought preferably to be between 10 mm to 15 mm (limits included). The spacings are independent of the width of the adhesive tape.

FIGS. 1-4 show—schematically and without wishing unnecessarily to restrict the inventive concept by the embodiments depicted—four different embodiments of the adhesive bonding system of the invention in a side section, with adhesive tapes of the invention resulting in particular from quasi-infinite extension of the adhesive bonding systems perpendicularly into the plane of the paper.

FIG. 1 shows an inventive adhesive bonding system K having a flat connecting element 1 between two carrier layers 2, 2' (a top carrier layer 2 and a bottom carrier layer 2'), which in turn are each coated with an adhesive 3, 3', in particular with pressure-sensitive adhesives (layers of adhesive 3, 3', each provided on the surface of each carrier layer 2, 2' that faces away from the connecting element 1). Optionally, there may be a liner 4 on at least one of the layers of adhesive 3, 3', particularly the layer of adhesive 3 on the top carrier layer 2 (depicted thus by way of example in the figures), which advantageously is divided into two sections 4a, 4b by a cut 5, a perforation or the like.

The adhesive bonding system has the outer adhesive tape boundary edges Ka and Kb. At least one of the boundary edges of the connecting element 1a, 1b does not extend in a straight line (in this case the edge 1a), depicted in FIG. 1 by the points 1c lying furthest in the direction of the adhesive bonding system edge Ka, and by the points 1d of the connecting element edge that lie furthest back. This connecting element edge 1a may, for example, extend in the form of a wave, and so in this case, in FIG. 1, the positional numeral 1c would represent the "crests" and the positional numeral 1d the "valleys" of the waves.

Figure 2:
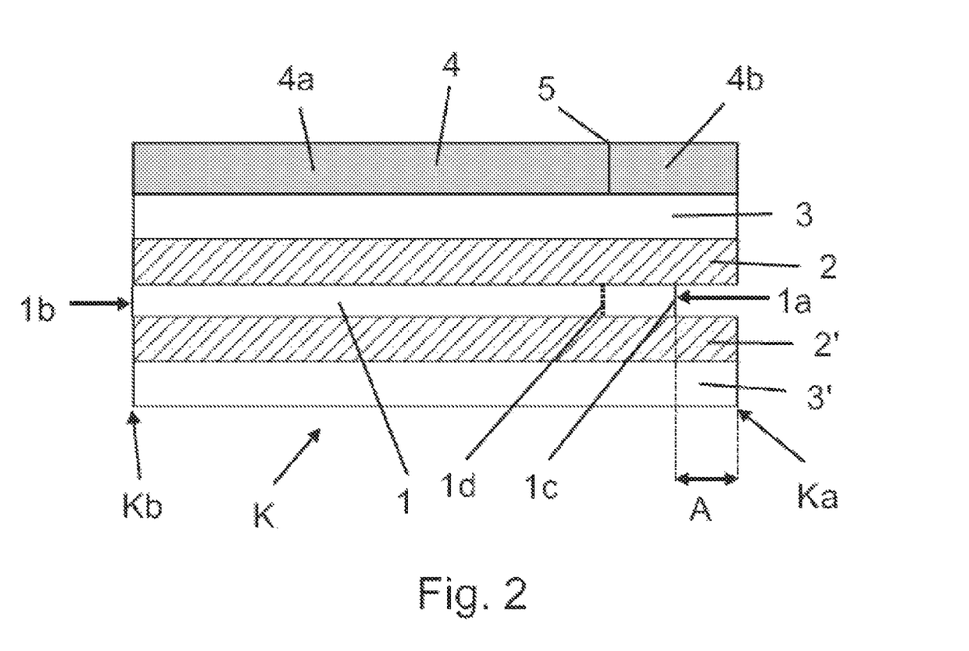
FIG. 2 is a cross-sectional view of an adhesive bonding system in an embodiment of the present invention.

FIG. 2 shows an embodiment of the invention in which the boundary edge 1a of the connecting element 1 is advantageously recessed by the distance A (with regard to the distance A, see also the remarks above).

Figure 3:
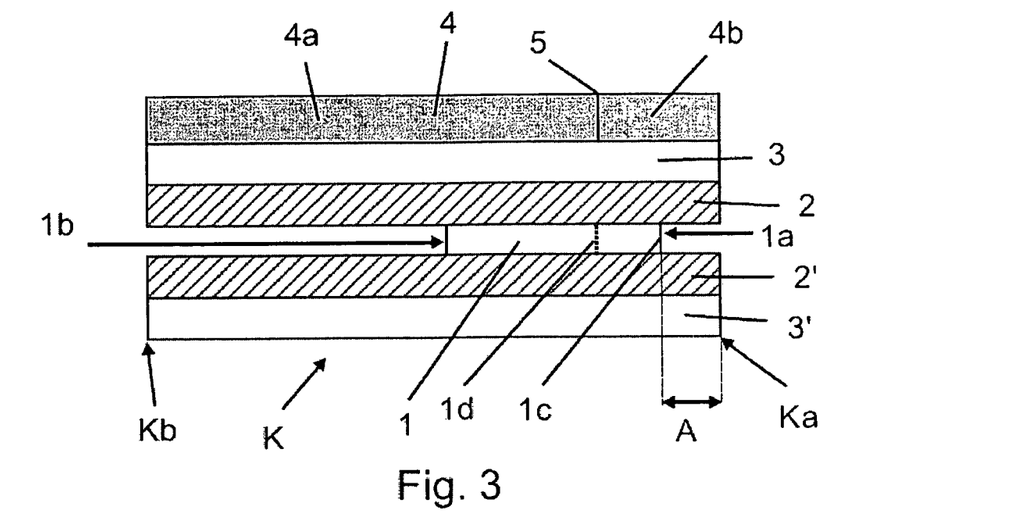
FIG. 3 is a cross-sectional view of an adhesive bonding system in an embodiment of the present invention.

FIG. 3 depicts, on the basis of an exemplary embodiment, the possibility that the opposite boundary edge 1b of the connecting element 1 may likewise be arranged with recession from the corresponding adhesive tape edge Kb, and so the connecting element 1, as viewed from the boundary edge a, extends only over a limited portion of the adhesive tape K.

Figure 4:
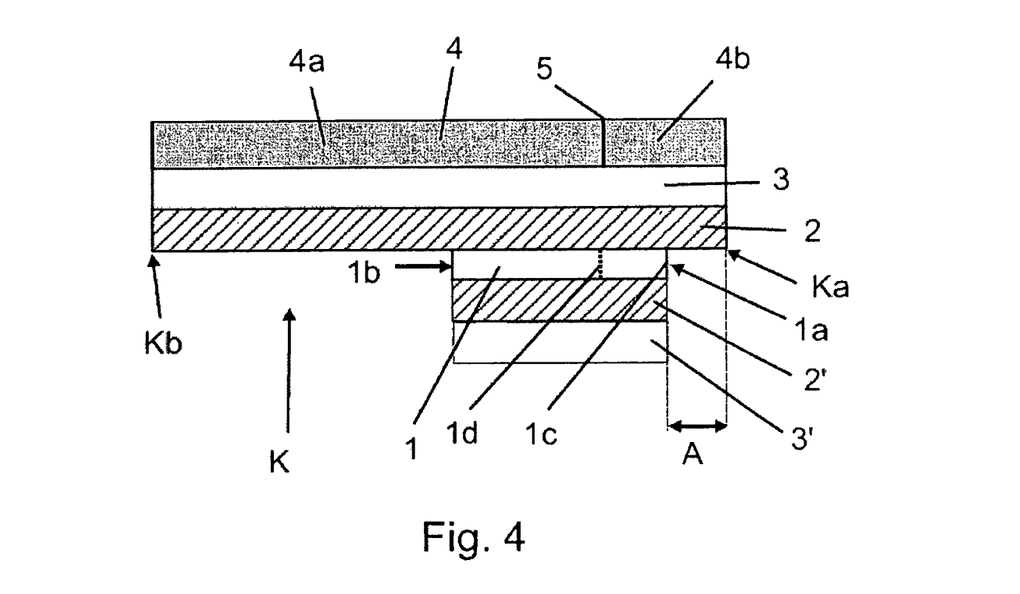
FIG. 4 is a cross-sectional view of an adhesive bonding system in an embodiment of the present invention.
Figure 5:
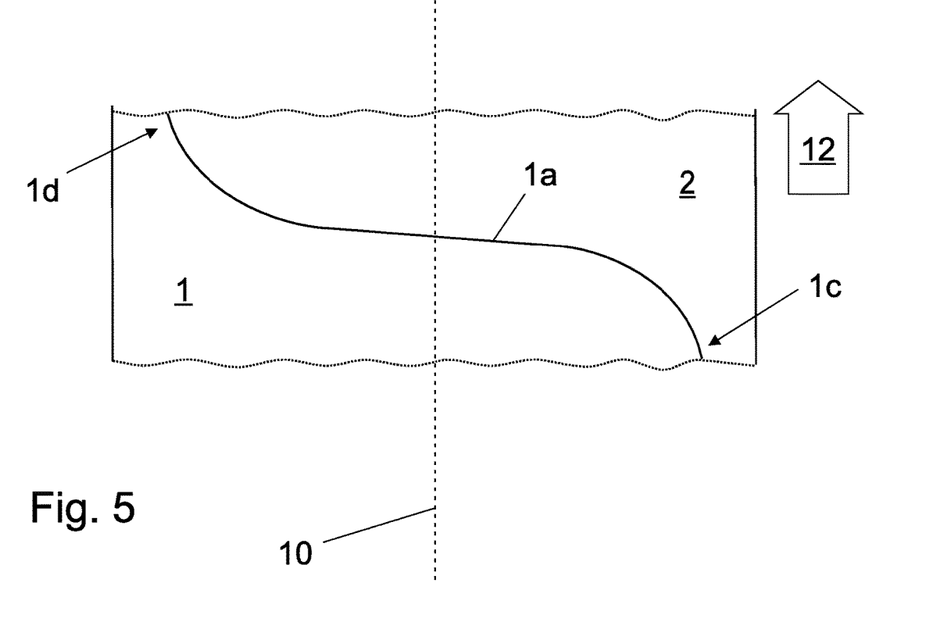

FIG. 4 shows by way of example, using a further embodiment, that the second carrier 2' (the bottom carrier in the figure) may be of narrower design, corresponding possibly, for example, substantially to the width of the connecting element 1. In this case the bottom carrier 2' may also be made wider than the connecting element 1 but narrower than the top carrier 2 (not depicted in the figure).

Since successful splicing is dependent on the total energy of the splitting process, the invention affords the advantage that different widths of the connecting element can be levelled by the wave form. In other words, with different widths of the adhesive tape, equal total energy values can be set through the wave geometry without having to adapt the polymer used or its coat weight.

The non-straight-line boundary edge may be designed in particular in the form of a wave line, which may be of uniform or non-uniform design. This wave form may be either symmetrical or asymmetrical. A symmetrical wave form comes about in particular from the boundary edge having periodically repeating sections for each of which it is possible to define a mirror axis which is arranged, in particular, perpendicularly to the emphasis line 10 of the corresponding edge.

The edges of the connecting element may advantageously be shaped in a manner like that depicted for the edges of a readily splitting adhesive tape in DE 10 2005 051 181 A. Accordingly, for this inventive embodiment, the at least one non-straight-line boundary edge of the connecting element is designed in such a way that it has projections which at their furthest-projecting points are rounded.

In a development of this embodiment, the non-straight-line edge at its furthest-recessed points is likewise of rounded design, preferably such that at these points the curvature is substantially sharper than at the projecting points. Advantageously, in each case between a furthest-projecting point and its closest furthest-recessed point, the non-straight-line edge is continuously differentiable, preferably with three inflection points. In another advantageous embodiment, in each case between a furthest-projecting point and its closest furthest-recessed point, the non-straight-line edge is continuously differentiable, with one inflection point. In a subsequent, inventively advantageous development, the non-straight-line edge is composed of an alternating sequence of semi-circles.

In one advantageous embodiment of the adhesive bonding system of the invention, for the at least one non-straight-line boundary edge of the connecting element, the negative of each recess is of narrower design than the positive of an adjacent projection. It may also be advantageous for the teaching according to the invention that the at least one non-straight-line boundary edge of the connecting element has two or more families of projections which project to different extents in accordance with a regular pattern.

In one advantageous embodiment of the splittable adhesive bonding system of the invention, both boundary edges of the connecting element do not extend in a straight line, and in particular possess the same period length.

In one advantageous development of the invention, it is the case, for the connecting element of the adhesive bonding system, that its leading edge and its trailing edge extend parallel to one another, so that, in spite of the non-linearity of the two connecting element edges, the width of the connecting element is the same everywhere. Reference is made to the corresponding geometries as depicted in DE 10 2005 051 181 A, the explanations therein concerning the edge profiles, and the figures therein, and so these are considered to be included in the disclosure content of the present specification.

Advantageous developments of the invention in relation to the profile of the at least one non-straight-line boundary edge of the connecting element are distinguished by the fact that this edge is not symmetrical with respect to a mirror axis—in particular to a mirror axis which stands perpendicularly to the emphasis line 10 of said edge.

This can be brought about advantageously by it being the case that—in the preferential direction along the emphasis line 10—for the majority of the projections the rising curve region up to the furthest-projecting point of the projection is less steep than the falling curve profile subsequent to this point of furthest projection; that the curve describing the boundary edge thus runs flatter in the rising region up to the projection maximum, for a multiplicity of the projections, than in the subsequent falling region. The steepness of each curve section also referred to as curve region) here is regarded as being the amount of the slope of a straight line which passes through two points bounding the respective curve section. The steepness therefore corresponds mathematically to the average of the first derivative of the curve section, insofar as the curve section can be represented as a Riemann integral of its first derivative.

An "askew" wave form of this kind may be realized in particular as an onward development of the embodiment corresponding to the edge forms of the kind known for adhesive tape edges from DE 10 2005 051 181 A.

Advantageous embodiments of the connecting element are such that its second boundary edge, which is opposite to the non-straight-line boundary edge, is designed in the form of a curve which is produced by parallel displacement of the curve describing the first boundary edge along a line standing perpendicular to its emphasis line 10—and, if appropriate, a simultaneous displacement along the emphasis line 10.

Another realization of the teaching according to the invention is produced by adhesive tapes in which the connecting element is constructed in the form of a multiply interrupted strip which extends in the longitudinal direction of the connecting element. In this arrangement each segment has one or more projections, particularly those which are of rounded form at their furthest-projecting points.

The adhesive bonding system of the invention differs from those of the prior art in particular by the fact that the connecting element between the two carrier layers is non-adhesive and is non-adhesively joined at least to one of the carrier layers. With particular advantage the adhesive bonding system of the invention has a connecting element which is not realized by a two-dimensionally splitting paper.

In the case of a connecting element which comprises, for example, a splitting paper provided adhesively at one or between two carrier layers, the forces must be set as inherent properties of the paper. It is correspondingly difficult to find suitable papers for this end use. If a connecting element is provided as proposed in the present specification, the advantage is gained that, through the choice of suitable polymers, laminating compositions or the like, and through the specific shaping of the element, influence may be had, very conveniently, over the resulting splitting forces, and these forces can be set optimally for the envisaged end use. Moreover, a connecting element of this kind can be made very thin: whereas the prior art here provides at least two layers of adhesive and a splittable ply, it is sufficient in accordance with the invention for there to be at least one, thin layer of a polymer, of a laminating composition or the like.

The connecting element is designed in particular in such a way that, under the kind of stresses that occur in the course of flying roll change, it reliably parts the join between the two carrier layers. In this sense the connecting element represents a "predetermined breakpoint" under such stress. For this purpose, the adhesive bonding system, comprising the carrier layers and the connecting element, is optimized in particular such that it effectively transmits those forces which are directed, within the plane of the adhesive bonding system, substantially transverse to its longitudinal extent, whereas, with respect to forces in the thickness direction of the adhesive bonding system, precisely on the contrary, failure is actually desired under levels of force which are as low as possible. Ensuring this behaviour is critically influenced by the choice and the design of the connecting element.

The connecting element may part from the top carrier layer or from the bottom carrier layer in order to separate the join; also realizable are embodiments where parting from both carrier layers is possible. In the case of the last-depicted variant, parting may take place simultaneously from both carrier layers, or parting takes place, statistically, in some cases from one and in some cases from the other carrier layer, without particular preference. Embodiments are realizable, additionally, in which parting is possible in principle from both carrier layers, but parting from one of the layers is preferred.

One version of the connecting element has at least two layers, the parting of the system occurring not by delamination from one of the two carrier layers but instead by parting of the two layers from one another. In order to improve the delamination behaviour of one of the carrier layers or else—on the side which is not to delaminate during the splicing operation—to impair such delamination behaviour, it is possible, between the polymer layer and the corresponding carrier layer, for a further layer to be provided which produces or promotes the corresponding effect. Advantageously it is possible for one of the carrier layers to be pretreated or coated in such a way that delamination of the polymer layer is promoted, and for the other of the carrier layers to be pretreated or coated in such a way that the adhesion of the polymer layer to that carrier layer is enhanced.

It is very advantageous to provide only very thin layers or to impregnate the carrier layer or layers themselves accordingly, in order to leave the overall thickness of the adhesive bonding system as low as possible. Moreover, the connecting element may be designed in such a way that the parting process of the two carrier layers from one another is brought about by rupturing of the connecting element—or of one layer of the connecting element—and that, in other words, there is no two-dimensional splitting in respect of this layer. In this case, residues of the ruptured layer of the connecting element remain both on the top carrier layer and on the bottom carrier layer.

In one advantageous embodiment of the adhesive bonding system of the invention, the connecting element does not represent a continuous layer. In particular the connecting element may be composed of a multiplicity of individual area elements which are provided between the carrier layers. Arrangements of this kind can be produced advantageously, for example, by applying the connecting element by screen printing or by means of a patterned roller to one of the carrier layers. The individual area elements may be arranged in particular in such a way that they are arranged contactlessly with respect to one another. Via the geometry of the area elements, i.e., for instance, via their geometric form, their size and/or their arrangement relative to one another, it is possible with outstanding effect to set the release forces needed to separate the two carrier layers from one another.

A feature of the connecting element between the two carrier layers is that it is connected non-adhesively to at least one of the two carrier layers, and with particular advantage to both carrier layers. By foregoing the use of layers of adhesive, the adhesive bonding system can be made very thin, which is advantageous for its use in particular in flying roll change.

Hence the paper web is run, for example, in printing and paper-finishing machines at high speeds through very narrow areas, such as roller pairs, nips, calendar stats, and the like; in the printing industry they are finally also introduced, for example, into folding apparatus. The thinner the adhesive tape can be made—with sufficient quality for the requirements associated with the splice—the lower the risk of unintended tearing or other faults in the automatic operation. Each of these faults is associated with considerable costs, since the plant must be halted and started up again later. Through the adhesive tape according to the invention, success has been achieved in largely avoiding these faults.

The connecting element is capable, under the conditions of a static or "flying" (in particular, automated) roll change, of opening the connection, and hence takes on the function of a "predetermined breakpoint". As a result of the absence of layers of adhesive, it is usually possible, for the purpose of producing the splitting process, not to use splittable paper, as is known from the prior art.

In one advantageous procedure it is possible to use a connecting element that comprises a polymer layer which is delaminable either from the top carrier layer or from the bottom carrier layer. Also realizable are embodiments in which the polymer layer is delaminable from both the top and the bottom carrier layers—for instance when in terms of apparatus there are no difficulties associated with where the delamination takes place. In the simplest version of this embodiment the polymer layer constitutes the connecting element.

The polymer layer or layers of the connecting element can be produced, for example, by applying the polymer that produces the polymer layer (a varnish, for instance) to one of the carrier layers—or, if appropriate, to an interlayer (more particularly a functional interlayer)—by printing, for example. If it is desired not to apply the polymer layer over the full area, it is outstandingly possible, for example, to employ screen printing. Placed atop the as yet undried polymer solution or the as yet uncured polymer can then be a further layer or, in particular—for connecting elements which are constructed from a polymer layer—the second carrier layer, so that drying and/or curing produces an assembly of the carrier layers by means of the polymer. Through the choice of the chemical nature of the polymer, the amount of polymer applied, the form of the application (full area, partial area, local, etc.), the choice of the carrier layer materials and the nature of the pretreatment of the carrier materials, it is possible to influence the force which is needed in order to delaminate the assembly, and also, furthermore, to influence the matter of from which of the carrier layers the polymer layer preferentially delaminates.

As a polymer layer for the adhesive bonding system of the invention it is possible with great advantage to use those polymers of the kind disclosed in WO 99/46196 A, particularly at page 9 lines 15 to 29 therein. Hence the polymer for the polymer layer may in particular be selected advantageously from the group encompassing polyvinyl chlorides, polyvinylidene chloride, polyvinyl alcohols, polyvinyl acetates, polyvinylpyrrolidones, copolymers of vinyl chloride and vinyl acetate. As additives it is possible for example to use wetting agents, defoamers, plasticizers and/or fungicides. One preferred polymer which is disclosed in the aforementioned publication and can also be used outstandingly in the present invention is a repulpable polymer, based, for example, on polyvinyl alcohol, which preferably further comprises one or more plasticizers. Plasticizers used with particular preference are compounds such as polyols (diethylene glycol, for example), hydroxy-modified rubbers or a combination of both.

Having emerged as being a further system useful to outstanding effect in accordance with the invention for polymer layers for the connecting element are primers of the kind known from the building and DIY sector for the preparation of paint finishes, renders, adhesives and floor-levelling compositions, where they are used in particular for the pretreatment of highly absorbent substances such as plaster building materials or chipboard, for example. Reference may be made here in particular to the polyacrylate-based primers. One commercially available deep-down primer which has emerged as being particularly suitable for use for the polymer layer or layers of the connecting element is sold under the name "Beste Basis" by the company Lugato, Hamburg, Germany.

In a further advantageous embodiment it is possible as the connecting element to make use in particular of systems which can be obtained by drying water-based compositions (water-based laminating composition). In the simplest version of this embodiment, the layer of laminating composition constitutes the connecting element. In this case the laminating composition is selected such that the assembly meets the requirements during the splicing operation, in other words produces the desired predetermined breakpoint. The laminating compositions are preferably selected such that, in the form of their dried films, even at relatively high temperatures, they possess no adhesive force, so that the areas that are exposed after the assembly has parted do not contaminate mechanical parts or production material. For use in the paper and printing industries it is desirable that the recycling process is not disrupted. Accordingly it is advantageous to select water-based compositions of the laminating composition, in which the auxiliaries customary in papermaking may be present.

As water-based compositions it is possible with great advantage to use cellulose-based systems, particularly those based on methylcellulose. Systems of this kind are available commercially as wallpaper pastes.

Particularly advantageous laminating compositions which can be used to outstanding effect for the adhesive bonding system of the invention are disclosed in, for example, EP 1 076 026 A. Laminating compositions of this kind which can be employed advantageously comprise, in addition to a binder, silicone-free additives with an easy-release activity; where necessary, elasticizing additives may additionally be present. As binders it is possible with advantage to use modified starches, or binders of the kind that have long been in use for wet adhesive tapes. As release agents the laminating composition preferably comprises easy-release additives, especially stearyl derivatives, in particular calcium stearate, talc and/or polymers which carry stearyl groups. Advantageously it is possible as release agents to use dispersions of polymeric release agents, such as dispersions based on copolymers of stearyl methacrylate or stearyl derivatives of maleic acid with styrene, for example. As elasticizing agents it is possible for example for water-soluble polyglycols to be used. In particular, aqueous preparations with 10% to 90% by weight of binder and 10% to 90% by weight of release agent and also up to 60% by weight of elasticizing agent can be used as a laminating composition. As binders it is preferred to use starch derivatives, e.g. anionic potato starch, in fractions of 30% to 70% by weight. Release agents used are preferably talc, Ca stearate and/or release-active copolymers with stearyl groups, in fractions of 30% to 80% by weight. For elasticization, polypropylene glycols or polyethylene glycols have proved to be highly suitable, preferably in amounts between 0% to 15% by weight. In this context the products of higher molecular mass that are solid at room temperature are used primarily. Further elasticizing agents which can be used to good effect in relatively large proportions are gum arabic and plastics having a similar profile of properties. The layer thickness of the laminating composition after drying is situated preferably in the range from 5 to 20 g/m². Likewise very effective for use as the connecting element of the adhesive bonding system of the invention can be laminating compositions of the kind described in the as yet still unpublished DE 10 2008 023 020, filed recently by the applicant.

The laminating adhesive that is described therein and can likewise be used with outstanding effect for the inventive adhesive bonding system of the present specification comprises at least one binder, more particularly a polysaccharide component, and at least one surfactant component, which acts in particular as a release agent. The surfactant component may be a single surfactant or may comprise two or more surfactants. The laminating adhesive can where necessary advantageously comprise further components, including, in particular, elasticizing additives (also elasticizing agents below). In one very preferred procedure the polysaccharide component is starch, gum arabic or derivatives of the aforementioned compounds.

The binder component may, furthermore, also be, for example, a stearate, more particularly magnesium stearate and calcium stearate. The composition of the binder component may also be such that a mixture of starch with one or more further binders is used. Starch as a binder has the clear advantage that the screen-printability possessed by the laminating composition is very good.

Laminating compositions that are particularly preferred in accordance with the invention have a polysaccharide fraction of up to 98% by weight, more preferably of up to 85% to 95% by weight, even better from 90% to 95% by weight. With particular preference it is possibles to use starch derivatives, especially hydroxypropyl ethers based on potato starch. One such starch is available, for example, from the company Emslandstarke under the name Emsol K55.

The surfactant content is very preferably 2% to 20%, better 5% to 15%, ideally 5% to 10% by weight. The above fraction figures refer, both for the polysaccharide component and for the surfactant component, to the mixture of surfactant and polysaccharide, in each case in the form of the amount based on the solids fraction. Additionally present for the preparation of the laminating composition is a solvent, more particularly water, preferably in fractions of 50% to 80% by weight. To prepare the laminating adhesives it is possible in particular to proceed by adding the solid surfactant to a 20% to 40% strength aqueous solution of the polysaccharide component.

Further additives to the laminating composition that may be used are, for example, talc, calcium stearate and/or release-active copolymers with stearyl groups, in fractions of 30%-80% by weight. Talc may be used in particular as a filler in order to adjust the screen-printability.

For elasticization, polypropylene glycols or polyethylene glycols have proved to be highly suitable, preferably in amounts between 0% to 15% by weight. In this context the products of relatively high molecular mass that are solid at room temperature are used primarily. Further elasticizing agents, which can be used effectively in relatively large proportions, are gum arabic and plastics having a similar profile of properties.

Surfactants are used as release agents. Particular preference is given to selecting nonionic and/or anionic emulsifiers. These surfactants may be monomeric, oligomeric or else polymeric in nature. Use is made preferably of surfactants with long side chains, in particular with side chains having 8 to 18 C atoms. Polar surfactants with relatively long-chain alkyl radicals have emerged as being particularly preferred, especially those surfactants with alkyl chains having at least 8, better still having at least 12, C atoms.

The following compounds have emerged as being particularly advantageous release agents for the present invention: sodium octadecylsulfosuccinate, sodium dialkylsulfosuccinate, Na n-dodecyl sulphate, sodium lauryl sulphate, ammonium lauryl sulphate, sodium oleylcetyl alcohol sulphate, fatty alcohol polyglycol ethers, fatty alcohol ethoxylate, nonylphenol ethoxylate. Disodium n-octadecylsulfosuccinate (ODSS) has emerged as being a particularly outstanding release agent in the inventive sense. When a laminating composition on this basis was used, it was possible to produce adhesive tapes that could be used with particular success (faultlessly) for a flying roll change. The compounds which can be used to outstanding effect as release agents for preparing the laminating composition of the invention include Na octadecylsulfosuccinate, Na dialkylsulfosuccinate, Na n-dodecylsulphate, $NH_4$ lauryl sulphate, Na oleylcetyl alcohol sulphate, fatty alcohol polyglycol ethers, fatty alcohol ethoxylate, nonylphenol ethoxylate.

In one advantageous procedure the adhesive bonding system of the invention is lined on at least one of its layers of adhesive, at least temporarily, with a release material, in particular for the purpose of facilitating handling. For this purpose it is possible to use the materials that are customary to the skilled person for this end use; the liner is composed more particularly of a siliconized material, preferably of siliconized paper. The liner may be divided, or prepared for possible division, into two sections with a cut or predetermined breakpoint, more particularly in the form of a perforation, kiss cut, slitting or the like, that runs in the longitudinal direction of the adhesive tape. The adhesive bonding system of the invention may in particular be present in the form of an adhesive strip that is extended in the preferential direction (and is also referred to below as an adhesive tape). The adhesive bonding system in adhesive tape form can be presented to outstanding effect in a form in which it has been wound up to form a roll (more correctly, from a geometric standpoint, an archimedean spiral).

The invention further provides a method of flying roll change using an adhesive bonding system of the invention.

The method of the invention of connecting two flat webs during flying roll change of flat-web material wound up to form rolls is described below with reference to an exemplary embodiment, without wishing the subject matter of the invention to be restricted unnecessarily through the choice of the exemplary embodiments. In a first variant of the method of the invention, the topmost flat web turn (in particular its end or its end region) of a new roll, having an adhesive bonding system of the invention that is suitable for obtaining an adhesive bond which can be released again in such a way as to be free from adhesive areas, is fixed to the underlying flat web turn, so that a part of a self-adhesive that is needed for joining to the outgoing flat web is exposed. Thereafter the new roll thus equipped is placed adjacent to an almost entirely unwound, old roll that requires replacement, and is accelerated to substantially the same rotary speed as that roll, and then is pressed against the old flat web, the exposed self-adhesive of the adhesive bonding system bonding to the old flat web when the webs have substantially the same speeds, while at the same time the bond of the topmost flat web ply (end ply of the turn) to the underlying flat web ply parts two-dimensionally in such a way that, after the parting operation, there are no adhesive regions exposed. The parting of the bond of the topmost flat web ply to the underlying flat web ply is accomplished in this case, in particular, by one of the parting mechanisms already described for the adhesive bonding system of the invention—in other words, by a parting of the connecting element, as described in detail above.

An adhesive bonding system of the invention is used, in other words a system comprising a top carrier layer and a bottom carrier layer, a flat connecting element that connects the two carrier layers to one another and is suitable for opening the connection under the conditions of a static or flying roll change, and also two layers of adhesive which are each provided on the surface of each carrier layer that faces away from the connecting element, the connecting element not being a layer of adhesive, and the connection between the connecting element and at least one of the carrier layers not being brought about by means of further layers of adhesive, and, furthermore, at least one of the boundary edges of the connecting element does not run in a straight line, and a straight-line emphasis line 10 (main direction line 10) is defined in relation to this boundary edge, the emphasis line 10 of this boundary edge extending along a preferential direction, and this boundary edge having a multiplicity of regions lying on one side of its emphasis line 10 and also a multiplicity of regions lying on the other side of its emphasis line 10.

In one advantageous development of the inventive method the adhesive tape is bonded at right angles to the running flat web. In other advantageous versions of the method according to the invention, the adhesive tape can also be bonded at an acute angle of up to 30° with respect to the running flat web, more particularly of up to 10°. In that case, particularly in the case of the adhesive tape bonded at right angles to the running flat web, the parting process preferably takes place transversely to the emphasis line of the non-straight-line boundary edge of the connecting element: that is, the parting process begins in those projections of the connecting element that project out the furthest.

The flat webs are, in particular, paper webs and/or film webs and/or textile material webs (wovens, knits, nonwovens or the like).

Through the form of the connecting element it is possible advantageously to set the corresponding parting force or release force, as a function of the material. The form or geometry of the connecting element means that as small as possible a force is needed for incipient splitting in the transverse direction of the adhesive tape. However, this force must also not be too small, in order not to cause premature opening of the roll of flat-web material to be spliced that is bonded with the adhesive tape of the invention, in the acceleration phase of the splicing operation, and so cause tearing. This applies in particular to belt-driven lines in which a particular strength is necessary in the region of the belt.

The adhesive tape of the invention has shown itself to be outstandingly suitable for the intended utility.

What is claimed is:

1. An adhesive bonding system for joining flat webs when changing rolls of such webs, wherein the adhesive bonding system has a length defined between two adhesive tape boundary edges of the adhesive bonding system, the adhesive bonding system comprising
   a top carrier layer and a bottom carrier layer
   a flat connecting element, having two boundary edges, that
      connects the two carrier layers to one another to form a connection between the two carrier layers,
      is adapted to open the connection between the two carrier layers under the conditions of a static or flying roll change, and
      has a length defined between the two boundary edges of the connecting element, and
   two layers of adhesive, each provided on the surface of each carrier layer that faces away from the connecting element,
   wherein,
      the connecting element has non-adhesive properties and is not a layer of adhesive,
      the connection between the connecting element and at least one of the carrier layers is not brought about by means of further layers of adhesive,
      the connecting element comprises a polymer layer that is delaminable from at least one selected from the top carrier layer and the bottom carrier layer, the polymer layer consists of polymer and, optionally, one or more additives, wherein the polymer is selected from the group consisting of polyvinyl chlorides, polyvinylidene chloride, polyvinyl alcohols, polyvinyl acetates, polyvinylpyrrolidones, and copolymers of vinyl chloride and vinyl acetate, wherein the one or more additives are selected from the group consisting of at least one additive selected from a wetting agent, a defoamer, a plasticizer, and a fungicide, a filler, and at least one of the boundary edges of the connecting element is non-linear and extends, perpendicularly with respect to the length of the connecting element, in a form of a wave having valleys and crests, wherein the valleys and the crests of the wave are located between the two adhesive tape boundary edges of the adhesive bonding system.

2. The adhesive bonding system according to claim 1, wherein the connecting element is in a form of a multiplicity of individual elements.

3. The adhesive bonding system according to claim 1, wherein the form of the wave has a uniform design or a symmetrical design.

4. The adhesive bonding system according to claim 1, wherein the form of the wave has a non-uniform design or an asymmetrical design.

5. The adhesive bonding system according to claim 1, wherein the form of the wave has periodically repeating sections.

6. The adhesive bonding system according to claim 1, wherein a further layer is provided between the polymer layer and the carrier layer from which the polymer layer is delaminable.

7. A method comprising connecting two flat webs, during flying roll change of flat-web material wound up to form rolls, with the adhesive bonding system according to claim 1.

8. A wound roll of an adhesive tape comprising the adhesive bonding system according to claim 1.

9. The adhesive bonding system according to claim 1, wherein the at least one of the boundary edges of the connecting element is recessed by a distance from at least one of the two adhesive tape boundary edges of the adhesive bonding system.

10. The adhesive bonding system according to claim 1, wherein the polymer of the polymer layer is based on polyvinyl alcohol and at least one additive is present and comprises one or more plasticizers.

* * * * *